May 23, 1944.       H. T. PYK       2,349,305
TWO-STROKE INTERNAL COMBUSTION ENGINE
Filed June 13, 1940    2 Sheets-Sheet 1

PRIOR ART

INVENTOR
Herman Theodor Pyk
BY
his ATTORNEY

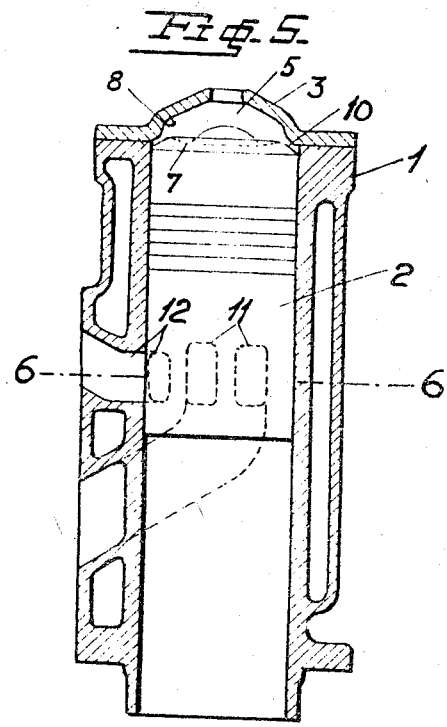
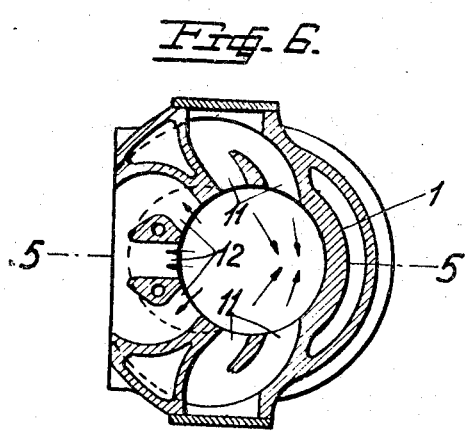

Patented May 23, 1944

2,349,305

UNITED STATES PATENT OFFICE 2,349,305

TWO-STROKE INTERNAL-COMBUSTION ENGINE

Herman Theodor Pyk, Saltsjo-Duvnas, Sweden

Application June 13, 1940, Serial No. 340,266
In Sweden April 6, 1940

5 Claims. (Cl. 123—32)

The present invention relates to two-stroke internal combustion engines having scavenging air ports and exhaust ports in the cylinder wall controlled by the piston and having further fuel injecting means centrally disposed in the cylinder head.

In order to obtain a favorable combustion and thus a high effective average pressure, above everything an effective scavenging of the cylinder and besides a form of the compression chamber suitable for the injection and the combustion is required.

Figure 1:
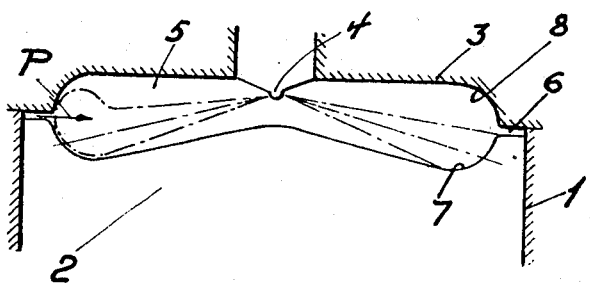
Figure 2:
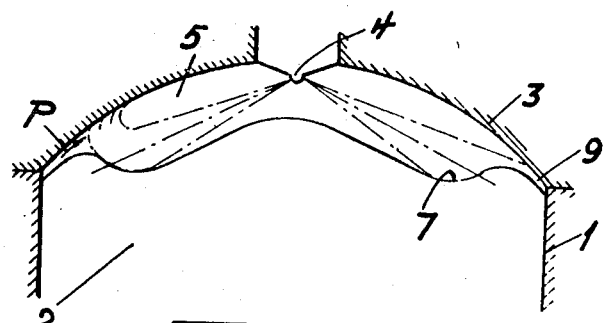
Figure 3:
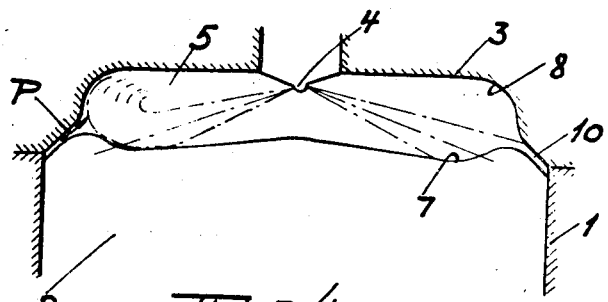
Figure 4:
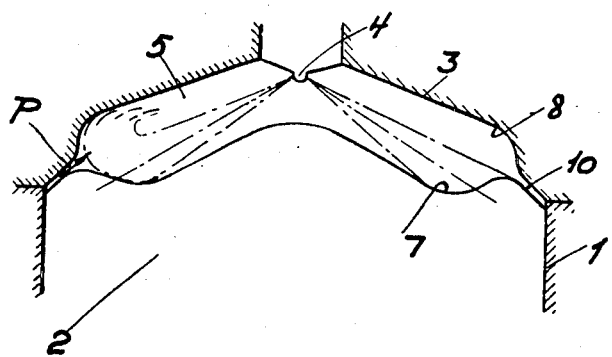

The invention will be elucidated in connection with the annexed drawings, in which Figs. 1 and 2 show different known forms of the compression chamber, whereas Figs. 3 and 4 show also diagrammatically two different forms of a compression chamber according to the invention. Fig. 5 is an axial section along the line 5—5 in Fig. 6 and Fig. 6 a cross-section along line 6—6 in Fig. 5 of the cylinder of an internal combustion engine having a so-called oppositely directed scavenging and a compression chamber of the form shown in Fig. 4.

In all of the figures, 1 denotes the cylinder, 2 the piston and 3 the cylinder head having a centrally disposed fuel injection 4. The compression or combustion chamber is denoted by 5.

It is previously known that an improved utilization of the air at the combustion can be obtained by concentrating the volume or bulk of the compression chamber to the periphery thereof. A compression chamber formed from this point of view may be wholly cylindrical or the axial distance between the piston and the cylinder head may increase towards the periphery, said latter formation being applied to a greater or less extent to all of the compression chambers shown.

Besides, in the embodiment according to Fig. 1 the compression chamber between the cylinder head 3 and the piston 2, when the latter is in its outer limit position, is so formed that outmost about the periphery there is formed an axially narrow annular space or bulk portion 6, which is directed perpendicularly to the cylinder axis and has a certain radial length. Besides, towards the centre the compression chamber is formed by recesses 7 and 8, respectively, in the piston and in the cylinder head.

Here, the recess 7 in the piston has been made with the object in view that the annular edge at the periphery of the piston resulting from said recess shall prevent the fuel rays from hitting the cooled cylinder wall, which would result in a condensation and precipitation of fuel on the said wall. However, here the direct disadvantageous action has been wholly overlooked, which occurs due to the bulk reduction between the annular faces of the piston and the cylinder head forming the space 6, when the piston approaches its outer limit position. The radially inwardly directed air-stream P generated at the said motion of the piston towards the annular surface at the periphery of the cylinder head will namely cross the fuel rays, part of the fuel being thereby present above the air-stream and pressed against the cylinder head resulting in an imperfect combustion. To this contributes also the condition that the said air-stream from the space 6 counter-acts the trough-driving capability of the fuel rays.

In the embodiment according to Fig. 2 the piston 2 is provided at the periphery with an annular conical surface and the cylinder head with a corresponding conical surface, an annular conical space or bulk portion 9 being formed between the said surfaces in the outer limit position of the piston. The conical surface of the cylinder head extends towards the centre and may be somewhat curved. The air-stream P occurring when the piston approaches the cylinder head will in this case follow the surface of the head, from which it cannot escape but soon will be arrested and, consequently, not able to act on the fuel rays in any considerable degree. Further, the air and the fuel possibly accompanying it will here be cooled, which also disadvantageously affects the combustion.

In the embodiment according to Fig. 3, recesses 7 and 8, respectively, are made in the piston 2 as well as in the cylinder head 3, as is the case in the known embodiment according to Fig. 1. However, in distinction from said latter embodiment, conical surfaces having a certain length and directed obliquely upwards towards the centre are here made at the periphery of the piston and the cylinder head, so that in the outer limit position of the piston there will be formed between the said surfaces an obliquely upwardly directed annular conical space or bulk position 10. In the present case the joint between the recesses and the conical faces are rounded.

Through the conical facing of the piston, which is known per se, it is obtained that the scavenging through the ports in the cylinder wall, when the piston is in its inner position, will be considerably improved, since by the said means the scavenging air obtains a suitable direction upwardly towards the cylinder head. This action will be particularly advantageous in such cases, where a so-called oppositely directed scavenging is used, as will be more clearly described below.

A wholly new action, which is obtained by providing the piston as well as the cylinder head with conical facings in combination with recesses at least in the head, consists in this that, when the piston approaches its outer limit position, the air present in the annular space 10 between the piston and the head is forced into the inner compression chamber 5, thereby effecting an air-stream P, which is particularly advantageous with respect to the incoming fuel rays. Hereby, an air-stream is namely obtained, which is directed towards the centre and passes upwards towards the cylinder head and to a great extent, thanks to the recesses 8, will pass above the fuel rays without the risk of being arrested. Thus, the incoming fuel is forced downwardly by the air-stream, and simultaneously the air-stream also hits and brings with it the fuel rays, which rebounds against the cylinder head from the piston.

Thus, by the said means it is gained that the fuel will be distributed evenly about the whole end face of the piston. Then, when the piston moves downwardly and the expansion takes place, the air present above the fuel will penetrate the fuel layer, whereby the combustion is maintained and intensified.

In other words, by the said means a more complete combustion is obtained than in the known forms of the combustion chamber, whereby the fuel consumption per horse-power-hour will be reduced. Besides, a greater quantity of fuel can be completely burned, which results in that the average pressure in the cylinder and thus also the effect of the engine can be increased.

In the embodiment according to Fig. 3, the surface of the cylinder head inside the recesses 8 is made plane.

The embodiment according to Fig. 4 differs from that one illustrated in Fig. 3 in this respect only that the surface of the cylinder head inside the recesses 8 is made conical instead of plane. The action is the same as that one of the embodiment according to Fig. 3.

Concerning the conical faces of the piston and the cylinder head it is to be noted that their angle to a plane perpendicular to the axis of the cylinder preferably can lie between 20 to 60° and that the radial length of the faces preferably can be between 3 to 15% of the diameter of the piston.

In the construction of working cylinders and pistons of two-stroke internal combustion engines for so-called double-directed scavenging it has hitherto been presumed that the scavenging air in order to give the best scavenging action, after it has passed the scavenging ports, so to say ought to sweep through the cylinder chamber and to shove the combustion gases ahead of it out through the exhaust ports. It has namely been thought to be of importance that the scavenging should proceed as continuously and evenly as possible, so that turbulences and thus a mixing of scavenging air and combustion gases should be prevented in the greatest possible degree. Thus, with this object in view the piston or the cylinder head or both have been formed in such a manner that the deflection of the air-stream upwardly as well as downwardly should be facilitated in every way and that the air-stream should be kept together to the greatest possible extent during the passage through the cylinder chamber.

However, according to tests made it has been proved that the said solutions of the problem are incorrect and not suitable for obtaining the best scavenging results. The air is namely much more easily movable than it is generally believed and its tendency of being mixed with the exhaust gases is very great, which according to what has been proved by tests made prevails particularly in the so-called even courses of streaming, which results in relatively great remaining whirl formations in separate parts of the combustion chamber, such as powerful vertical whirls prependicularly to the symmetry plane. Thereby, large quantities of scavenging air will be forced out through the exhaust ports, whereas the whirl formations, consisting in part of combustion gases will remain in the cylinder, after the piston having covered the exhaust ports. Many attempts have been made in order to get rid of the said whirls by suitable location of certain scavenging ports etc. However, any really satisfactory results have not been obtained, and for this reason the single-directed scavenging with scavenging ports in the lower part of the cylinder and exhaust valves in the cylinder head more and more has been made use of, a system which, though more expensive, yet more easily leads to one of the aims, i. e. to a high scavenging efficiency.

However, a scavenging of the so-called double-directed art ought to have an entirely different course. Thus, it has been proved to be advantageous to throw the scavenging air upwards towards the upper parts of the cylinder at the greatest possible velocity and with respect to the direction of movement of the air stream to make the cylinder head of such a shape that the scavenging air stream be not deflected downwards but instead will be divided and converted into a great number of small whirl-formations, which get a tendency of remaining in the upper part of the cylinder and gradually displace the exhaust gases. It is true that also in this case whirl-formations occur in the layer between the scavenging air and the exhaust gases, but also here the whirls will be small and gradually displaced by the pure scavenging air, and the mixtures will be forced out through the exhaust ports during the last period of the scavenging process.

By making an upwardly directed deflection at the inner surfaces of the cylinder head from the inner periphery of the conical facing, i. e. by making a recess in the cylinder head, in combination with the conical facing of the piston, it has been proved that the above mentioned even scavenging stream does not occur and that the desired stopping up of the scavenging air in the upper part of the cylinder is obtained. The said result is attained not only when using the common double-directed scavenging but in a still greater degree at the use of the so-called oppositely directed scavenging, i. e. when the scavenging takes place through ports, which are directed by pairs against the cylinder wall located opposite to the exhaust ports, as shown in Figs. 5 and 6. In the said figures, which show an arrangement of the said ports known per se, 11 denotes the two pairs of scavenging ports and 12 the exhaust ports. As mentioned, the compression chamber 5 is formed in accordance with the chamber shown in Fig. 4.

Obviously, the scavenging ports can be arranged in other manner, for instance so that the scavenging air substantially will be directed along the cylinder wall opposite to the exhaust ports or so that the scavenging air will be directed against as well as along the said wall.

What I claim as new and desire to secure by Letters Patent of the United States of America is:

1. In a two-stroke internal combustion engine, a cylinder including a head and having piston-controlled scavenging air and exhaust ports in the wall thereof, a fuel injector centrally located in the cylinder head, and a piston including a head reciprocable in said cylinder, the peripheral marginal surfaces of the piston head and the cylinder head being conical to provide an annular frusto-conical clearance space immediately adjacent to the cylinder wall when the piston is at one end of its stroke, said space being inclined radially inwardly toward the head end of the cylinder, the portions of the surfaces of the cylinder head and the piston head immediately adjacent to the inner periphery of said marginal surfaces extending in directions respectively diverging from the imaginery conical envelope obtained by extending said marginal clearance space radially inwardly towards the axis of the cylinder and the portions of said surfaces inwardly of the first mentioned portions being shaped to provide a combustion chamber of shallow depth in relation to its diameter extending in open and unobstructed fashion to the inner margin of said conical clearance space and having substantial portions of its volume located on either side of said envelope and immediately adjacent to said clearance space when the piston is at said one end of its stroke.

2. In a two-stroke internal combustion engine, a cylinder including a head and having piston-controlled scavenging air and exhaust ports in the wall thereof, a fuel injector centrally located in the cylinder head, and a piston including a head reciprocable in said cylinder, the peripheral marginal surfaces of the piston head and the cylinder head being conical to provide an annular frusto-conical clearance space immediately adjacent to the cylinder wall when the piston is at one end of its stroke, said space being inclined radially inwardly toward the head end of the cylinder, the portions of the surfaces of the cylinder head and the piston head immediately adjacent to the inner periphery of said marginal surfaces extending in directions diverging from an imaginary conical surface having its apex at said injector and its base at the inner periphery of the marginal surface on said cylinder head and the portions of said surfaces inwardly of the first mentioned portions being shaped to provide a combustion chamber of shallow depth in relation to its diameter extending in open and unobstructed communication with said conical clearance space and having substantial portions of its volume located on either side of said imaginary surface and immediately adjacent to said clearance space when the piston is at said one end of its stroke.

3. In a two-stroke internal combustion engine, a cylinder including a head and having piston-controlled scavenging air and exhaust ports in the wall thereof, a fuel injector centrally located in the cylinder head, and a piston including a head reciprocable in said cylinder, the peripheral marginal surfaces of the piston head and the cylinder head being conical to provide an annular frusto-conical clearance space immediately adjacent to the cylinder wall when the piston is at one end of its stroke, said space being inclined radially inwardly toward the head end of the cylinder, the portions of the surface of the cylinder head immediately adjacent to the inner periphery of the marginal surface thereon extending in a direction diverging from the imaginary conical envelope obtained by extending said marginal clearance space radially inwardly towards the axis of the cylinder, the portions of the surface of the piston head immediately within the marginal surface thereon being formed with a depression having walls inclined oppositely to the inclination of said marginal surface and the portions of said surfaces inwardly of the first mentioned portions being shaped to provide a combustion chamber of shallow depth in relation to its diameter extending in open and unobstructed fashion to the inner margin of said conical clearance space and having substantial portions of its volume disposed on either side of said envelope and immediately adjacent to said clearance space when the piston is at said one end of its stroke.

4. In a two-stroke internal combustion engine, a cylinder including a head and having piston-controlled scavenging air and exhaust ports in the wall thereof, a fuel injector centrally located in the cylinder head, and a piston including a head reciprocable in said cylinder, the peripheral marginal surfaces of the piston head and the cylinder head being conical to provide an annular frusto-conical clearance space immediately adjacent to the cylinder wall when the piston is at one end of its stroke, said space being inclined radially inwardly toward the head end of the cylinder, the portions of the surfaces of the cylinder head and the piston head immediately adjacent to the inner periphery of said marginal surfaces extending in directions respectively diverging from the imaginary conical envelope obtained by extending said marginal clearance space radially inwardly towards the axis of the cylinder and the portions of said surfaces inwardly of the first mentioned portions being shaped to provide a combustion chamber of shallow depth in relation to its diameter extending in open and unobstructed fashion to the inner margin of said conical clearance space and having substantial portions of its volume located on either side of said envelope and immediately adjacent to said clearance space when the piston is at said one end of its stroke, the angle between said conical surfaces and a plane normal to the axis of the cylinder having a value of between 20° and 60°.

5. In a two-stroke internal combustion engine, a cylinder including a head and having piston controlled scavenging air and exhaust ports, a piston including a head reciprocable in said cylinder, the peripheral marginal portion of the piston head surface being conical and inclined radially inwardly toward the head end of said cylinder to cooperate with the scavenging ports in directing the flow of scavenging air in the cylinder and the portion of the piston head surfaces adjacent to said marginal portion being depressed toward the axis of the piston, the marginal portion of the cylinder head surface being conical to mate with the conical piston head surface and provide a frustro-conical clearance space immediately adjacent to the cylinder wall when the piston is at one end of its stroke, the portion of the cylinder head surface immediately adjacent to the conical portion thereof being recessed to diverge from the imaginary envelope obtained by extending said marginal clearance space inwardly toward said axis and the remaining radially inner portions of said piston and cylinder head surfaces being shaped to provide a combustion chamber of shallow depth in relation to its diameter extending in open and unobstructed fashion to the inner margin of said conical clearance space, and a fuel injector centrally located in said cylinder head, said injector having orifices for directing fuel in a plurality of widely divergent rays generally toward said depressed portion of the piston head surface and on the piston side of said envelope, whereby to cause the fuel to be deflected by said depressed portion of the piston head surface toward the recessed portion of the cylinder head surface and to be intersected by and mingled with the inwardly directed air envelope ejected from said clearance space before the deflected fuel reaches the immediate vicinity of the cylinder head surface.

HERMAN THEODOR PYK.